United States Patent [19]

Howard

[11] Patent Number: 4,826,181
[45] Date of Patent: May 2, 1989

[54] SEAL UTILIZING COMPOSITES OF FLEXIBLE GRAPHITE PARTICLES AND AMORPHOUS CARBON

[75] Inventor: Ronald A. Howard, Brook Park, Ohio

[73] Assignee: Union Carbide Corporation, Danbury, Conn.

[21] Appl. No.: 154,034

[22] Filed: Feb. 9, 1988

[51] Int. Cl.[4] .......................... F16J 15/30; B05D 3/02; B32B 5/16

[52] U.S. Cl. ........................................ 277/112; 277/1; 277/125; 277/DIG. 6; 427/227; 428/244; 428/408

[58] Field of Search ...................... 277/DIG. 6, 1, 102, 277/227, 112, 237, 123, 125, 235 A, 235 B; 427/227, 228; 428/244, 408

[56] References Cited

U.S. PATENT DOCUMENTS

| | | |
|---|---|---|
| 1,137,373 | 4/1915 | Aylsworth . |
| 3,932,568 | 1/1976 | Watts et al. ............................ 264/29 |
| 4,190,257 | 2/1980 | Schnitzler ............................ 277/102 |
| 4,234,638 | 11/1980 | Yamazor et al. ..................... 428/102 |
| 4,256,317 | 3/1981 | Havens et al. ....................... 277/112 |
| 4,279,952 | 7/1981 | Kodama et al. ................. 428/408 X |
| 4,301,222 | 11/1981 | Emanuelson et al. ............ 429/34 X |
| 4,457,491 | 6/1984 | Dudman ............................. 251/317 |
| 4,466,995 | 8/1984 | Boxall et al. ..................... 427/228 X |
| 4,481,052 | 11/1984 | Buchta ............................ 427/228 X |
| 4,490,828 | 12/1984 | Fukuhara et al. ............. 219/553 X |
| 4,526,911 | 7/1985 | Boxall et al. ........................ 523/445 |
| 4,592,968 | 6/1986 | Taylor ..................................... 429/34 |
| 4,692,418 | 9/1987 | Boecker et al. ................. 423/345 X |
| 4,714,257 | 12/1987 | Heinrich et al. ......... 277/DIG. 6 X |

Primary Examiner—Robert S. Ward
Attorney, Agent, or Firm—Lawrence G. Kastriner

[57] ABSTRACT

Composites of flexible graphite particles and an amorphous carbon phase useful for applications such as valve packing end rings.

10 Claims, 1 Drawing Sheet

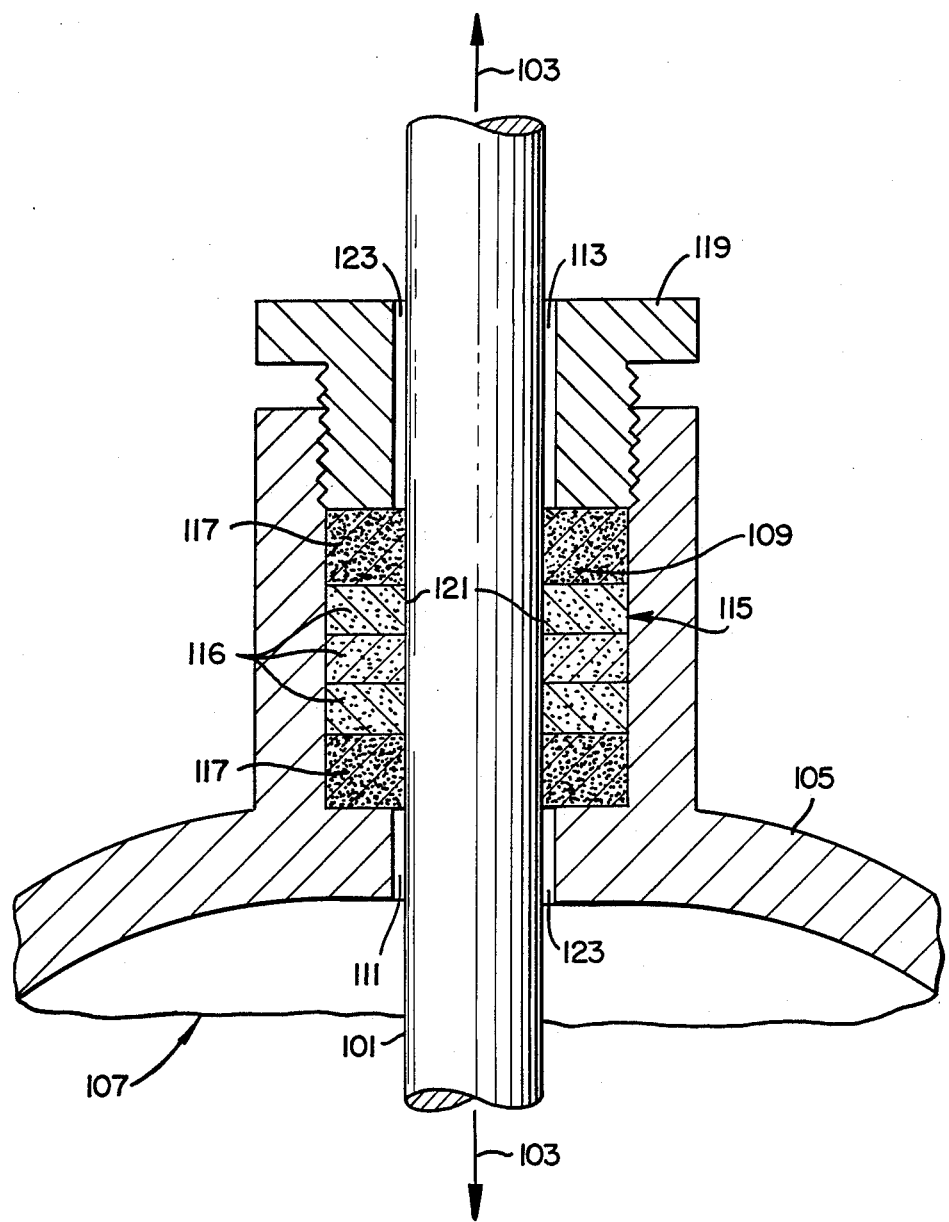

SEAL UTILIZING COMPOSITES OF FLEXIBLE GRAPHITE PARTICLES AND AMORPHOUS CARBON

FIELD OF THE INVENTION

The present invention relates to a composite suitable for retaining resilient packing materials, and the like, in particular a composite having chemical inertness, high temperature stability, and sufficient stiffness to prevent flow or migration of the packing material under pressure.

BACKGROUND OF THE INVENTION

In a fluid handling device, such as a valve or a pump, where a moving stem or shaft extends through a wall of the device, a seal is required at that point to prevent the fluid from leaking from the device. This is often accomplished by packing a compressed packing material around the shaft, and containing the packing material in its compressed state in a stuffing box. The packing material should be resilient such that it deforms under compression to conform to the interior of the stuffing box and form a tight seal against the moving shaft. The packing material should also present a low friction surface to the moving shaft and be stable under the environmental conditions to which it may be exposed.

It is also desirable that as the shaft pass through the stuffing box, it be wiped or cleaned of foreign material. Accordingly, it is preferable that along with the packing material, the stuffing box contain a material slightly abrasive to remove foreign material from the shaft without scratching or scoring the surface.

Flexible graphite has been used successfully as a packing material, as disclosed, for example, in U.S. Pat. No. 4,190,257. As used herein, the term "flexible graphite" means a material comprising essentially of graphite produced by compressing exfoliated graphite flakes to form a coherent product. Flexible graphite is favored as a packing material because its resiliency allows the packing material to conform its shape to the inner dimensions of a stuffing box and form an exact interference fit with the shaft, thus providing a seal. In addition, since it is essentially pure carbon, it has excellent thermal stability and chemical resistance. A problem with flexible graphite packing material is that it tends to extrude or flow into the clearance where the shaft passes through an opening in the stuffing box. This problem is particularly severe where the clearances are large, due, for example, to wear.

A solution to this problem is to provide a packing system which includes an annular end ring around the shaft where the shaft passes through the opening of the stuffing box. The end ring should be of a material sufficiently stiff to prevent extrusion of the end ring itself, but sufficiently resilient to form a tight seal around the shaft. The end ring functions to block or reduce the clearance between the shaft and the stuffing box and prevent packing material from extruding into the clearance.

A commonly used end ring material is braided carbon or graphite fibers. While successful to a degree, these packing materials generally contain lubricants which are not thermally stable, and volatilize upon heating, resulting in a loss of volume of the end ring. This in turn results in leaks due to loss of compression of the packing material. In addition, carbon and graphite fibers tend to fracture through movement of the shaft, producing small particles which are lost from the stuffing box, which also results in loss of volume of the end ring. These small particles also cause excessive wear to the packing material, resulting in early failure of the packing material.

It would be desirable to have a material for an end ring which is resilient such that under pressure it will conform with the interior shape of the stuffing box and the surface of the shaft, and yet have a stiffness which would inhibit flowing or extrusion. Preferably, such a material would also have abrasion resistance to prevent attrition and loss of volume of the end ring.

It is known that reinforced flexible graphite articles can be produced by pressing the flexible graphite together with a reinforcing material such as a wire mesh, or by laminating flexible graphite sheets to reinforcing polymeric or metal sheets. Examples of such articles are disclosed in U.S. Pat. Nos. 4,457,491, and 4,234,638. However, the presence of these reinforcing agents usually degrade the chemical inertness and the thermal resistance of these composites. In addition, metal reinforcements in an end ring may score the shaft and cause excessive wear.

Aylsworth, in U.S. Pat. No. 1,137,373, describes a composition in which exfoliated or expanded graphite flakes are mixed with a binder so as to coat all the exposed surfaces and the individual laminae of the graphite. The mixture is then compressed and the binder hardened or cured forming a composite comprising individual laminae of graphite bound together by a binder. The molded product may be carbonized by heating to the red heat in contact with air. These composites, although made of exfoliated graphite, do not have the microstructure of flexible graphite since each lamina is surrounded by the binder, and would have properties more similar to the binder and not have the resilience of flexible graphite materials.

In U.S. Pat. No. 4,190,257, a packing material is disclosed comprising particles of flexible graphite compressed together into a packing ring. Optionally, phenolic resins or carbon fibers may be added to act as binders or reinforcement.

OBJECTS OF THE INVENTION

An object of the invention, therefore, is to provide a material which is resilient, but is sufficiently stiff to resist flow or migration under pressure.

Another object of the invention is to provide a material wherein the resiliency and stiffness can be controlled.

Another object of the invention is to provide a material which is chemically resistant, thermally stable, and has a degree of resilience.

Another object of the invention is to provide a material which is harder and more wear resistant than flexible graphite.

Another object of the invention is to provide a material that when used as an end ring for stuffing boxes will not extrude into the clearance between the shaft and the stuffing box and will prevent extrusion of the packing material into the clearance.

Other objects will become evident in the description that follows.

SUMMARY OF THE INVENTION

One embodiment of the invention comprises a composite comprising particles of flexible graphite and an amorphous carbon phase binding the flexible graphite particles together.

Another embodiment of the invention comprises a seal adapted to prevent fluid leakage through the clearance between a moving shaft and the edge of an aperture where the shaft passes through the aperture in a wall which comprises:

(a) container means disposed upon the wall and around the shaft and around the aperture in the wall;

(c) resilient packing material disposed in the container means around the shaft;

(b) end ring disposed within the container means around the shaft over the clearance between the shaft and the edge of the aperture and adjacent the packing material, the end ring comprising particles of flexible graphite and an amorphous carbon phase binding the flexible graphite particles together; and (d) compression means to compress the end ring and packing material in the direction of the shaft axis to cause the packing material to conform to the interior space of the container means and the shape of the shaft to provide a seal, and to cause the end ring to block the clearance between the shaft and the edge of the aperture to inhibit extrusion of the packing material through the clearance.

Another embodiment of the invention is a process for producing a composite comprising particles of flexible graphite and amorphous carbon phase binding the flexible graphite particles together, which process comprises:

(a) comminuting flexible graphite shapes to provide particles of flexible graphite;

(b) mixing the particles of flexible graphite with an organic binder to provide a mixture of between 40 and 99 weight percent flexible graphite particles and between 1 and 60 weight percent binder;

(c) molding the mixture into a coherent shape; and (d) heating the shape to a temperature to carbonize the binder.

The particles of flexible graphite are derived from flexible graphite shapes, such as sheet materials which are commercially available, for example, from Union Carbide Corporation, Danbury, Conn., under the name GRAFOIL ®. Flexible graphite sheet is formed by treating graphite flakes with an intercalation agent, typically a mixture of sulfuric and nitric acids, and exposing the treated graphite flakes to a temperature, typically in excess of 1000° C., to form expanded exfoliated graphite flakes. The exfoliated graphite flakes are then compressed together without a binder, typically into flat sheets. A fuller description of flexible graphite and a process for making same is found in U.S. Pat. No. 3,404,061, which is hereby incorporated by reference.

In the manufacture of the composites of the invention, the flexible graphite particles are obtained by comminuting the flexible graphite using conventional means, i.e. by a hammer mill, a shredder, cutting knives, or the like.

The flexible graphite particles are then mixed with an organic binder material, such as liquid or solid thermosetting or thermoplastic resin, or pitches, to form a mixture having from 40 to 99, preferably from 65 to 90, weight percent flexible graphite particles, and 1 to 60, preferably from 10 to 35, weight percent binder, based on the total weight of the mixture. The organic binder should be coke forming in order to form the amorphous carbon phase. Material with a coke yield greater than 40 percent are preferred.

The mixture is then molded into the desired shape by conventional techniques, such as compression molding or the like. The molded shape is then subjected to a temperature sufficient to carbonize the resin to form an amorphous carbon phase. If the organic binder is a thermosetting resin, it may be optionally cured before the carbonization step.

The amorphous carbon phase is substantially non-crystalline carbon formed by carbonization or coking of the organic binder. However, it is understood that the amorphous carbon phase may be partially crystalline, and contain ordered or partially graphitic molecular structures.

The preferred use of the composites of the invention is as an end ring in a seal around a shaft of a fluid handling device wherein a shaft passes through an aperture in a wall of the device. The seal of the invention comprises a containment means, such as a stuffing box, disposed on the wall around the aperture. A packing material is placed in the containment means so as to surround the shaft. An and ring comprising the composite of the invention is placed around the shaft and between the aperture and the packing material. When the end ring and stuffing material combination are compressed, the resilient stuffing material conforms with the interior space of the containment means, that space not otherwise occupied by the end ring, and forces a surface of the stuffing material to bear against the shaft, thereby providing a seal to fluids. The compression of the end ring cause an inner surface of the end ring to bear against the shaft so as to block the clearance and thereby inhibit the resilient packing material from extruding through the clearance.

In a typical seal, the movable shaft exits the fluid handling device though a first aperture, into and through a container means or stuffing box, and out of the stuffing box through a second aperture. The end ring of the invention is preferably applied at both apertures, with the resilient packing material between the end rings. The seal of FIG. 1, which is discussed in more detail below, is typical of such a seal.

Preferably, the resilient packing material used in the seals of the invention is a flexible graphite material, but may also be other resilient packing materials, such as asbestos rope packing.

The composites of the invention are particularly useful in applications requiring a resilient material with sufficient stiffness to resist creeping or flow of the seal. As discussed above, a preferred application is as an end ring. In addition, any other application benefiting from the resilience and stiffness of the composites of the invention are contemplated, such as for example, a thrust bearing ring in a ball valve.

The composites of the invention of flexible graphite particles and amorphous carbon phase are particularly useful in high temperature applications or in chemically corrosive environments. Since these composites are essentially elemental carbon, they have the same thermal stability and corrosion resistance of other carbon materials such as flexible graphite.

The composites of the invention are also useful in applications requiring a bearing surface which wipes or cleans the shaft as it travels through the seal, such as, for example, in reciprocating pumps and valves. The amorphous carbon binder phase, in addition to imparting stiffness to the composites of the invention, provides a slightly abrasive surface which provides this cleaning action without undue wear and abrasion of the shaft material.

In the composites of the invention, the flexible graphite particles impart resilience to the composites, but unlike flexible graphite, the composites of the invention are stiffer, i.e. more resistant to extrusion and flow when under pressure. The stiffness is imparted by the amorphous carbon phase. However, the composites of the invention are more resilient than amorphous carbon, which is hard, nonresilient, and brittle.

DESCRIPTION OF THE DRAWING

The sole FIGURE shows a stuffing box in cross section incorporating end seals of the present invention.

DESCRIPTION OF THE INVENTION

In general the size of the flexible graphite particles is not very critical. However, the particle size should be sufficiently small such that particles are substantially uniformly dispersed through the amorphous carbon phase. In addition, a large amount of very fine particles would seriously reduce the resiliency. In general, less than about 20 weight percent, based on the weight of the graphite particles, of particles less than 200 mesh (Tyler) (0.074 mm) is suitable.

The flexible graphite particles are then mixed with a binder which serves as a precursor to the amorphous carbon phase. Preferably the binder, when subjected to coking temperatures, has a high coke yield. Suitable binders include thermoset resins, thermoplastic resins, and pitches. Preferred binders are liquid thermoset resins, in particular phenolic based resins.

The mixing of the flexible graphite and the resin may be accomplished using any known mixing method to thoroughly disperse the binder throughout the flexible graphite particles. The binder may be in the form of a liquid or a powder. Liquids are preferred because of the ease of dispersal into the flexible graphite particles. Liquid binders may require a dispersant to reduce the viscosity to aid in the dispersion. Solid, or viscous binders may require some heating to liquefy the binder. The mixing should be gentle to prevent excessive attrition of the flexible graphite particles. Suitable blenders include twin shell or V-blenders, drum blenders, Hobart TM mixers, and the like.

The amount of binder is chosen such that in the final composite the amorphous carbon phase is evenly distributed through the composite. Generally binder amounts between 1 and 60 wt. % are suitable, but amounts greater than about 10 weight percent are preferred to insure sufficient amorphous carbon phase in the product.

For ease in handling, liquid binder materials are preferred, and are preferably present in an amount sufficient to produce a flowing powder-like mixture, as opposed to a pasty or semiliquid mixture. For liquid phenolic binders, as used in the examples below, amounts less than 35 wt. %, based on the weight of the mixture, are suitable.

The mixture is then molded into the desired shape. The molding forms a coherent shape such that the shape retains its integrity when baked to transform the binder into an amorphous carbon. The molding conditions are chosen according to the binder material used. Any dispersants and the like used in the mixing should be evaporated off before the molding. Thermoplastic or pitch binders may require heating of the mixture to soften or liquefy the binder material during the molding procedure.

If the binder is a thermosetting resin, then the molded shape ma be optionally heated to cure the thermosetting resin. Curing of the thermosetting resin may not be required if the molded shape maintains its structural integrity during baking without previously curing the resin.

The article is preferably molded under sufficient pressure to achieve a density between 55 and 135 lb/ft$^3$, preferably between 90 and 100 lb/ft$^3$. Carbonization generally results in some loss of the density, depending in large part upon the coking value of the organic binder, and the amount of organic binder used in the manufacture of the article. The final density of the composite after carbonization is preferably between 50 and 130 lb/ft$^3$, preferably 80 to 100 lb/ft$^3$. Generally the lower the density the more resilient the composite.

The resiliency of the composite may be increased by using a larger particle size of the flexible graphite, or by lowering the content of the amorphous carbon phase by reducing the amount of binder in the binder/flexible carbon mixture.

The amorphous carbon phase in the final composite is generally between 1 and 50 wt. % of the composite, based on the total weight. In the preferred practice of the invention wherein 10 to 35 wt. % binder was used in the binder/flexible carbon mixture, the amorphous carbon phase in the final composite is generally between about 8 to 33 wt. % of the composite. In general, the compressibility of the composites of the invention is between about 5 and 11%, as measured by ASTM F-36 test method.

The molded shape of binder and flexible graphite particles is baked to a temperature to carbonize the binder and form an amorphous carbon phase. The temperature depends upon the binder used, but generally temperatures above 400° C. are suitable. In general the binder should be carbonized at the highest temperature to which the composite may be subjected. Carbonization temperatures between 450° C. and 1000° C. are suitable. Higher carbonization temperatures may be used, but may reduce the hardness of the amorphous carbon phase. The preferred degree of hardness is achieved at a carbonization temperature between 475° C. and 675° C. For valves in industrial applications, the carbonizing temperature is preferably between 500° C. and 600° C. The rate of temperature rise should be sufficiently slow to prevent structural defects in the final product due to thermal stresses.

As indicated above, a preferred use of the composites of the invention is as an end ring. The figure is a simplified cross sectional view of a seal of the invention using two end rings. Reciprocating shaft 101 (as shown by the arrows 103) passes through an outer wall 115 of a fluid handling device 107, such as a valve or pump, into a container means or stuffing box 109 through a first aperture 111, through the stuffing box 109, and out of the stuffing box 109 through second aperture 113. The stuffing box 109 contains a packing 115 comprising a conventional flexible graphite packing material, typically in the form of molded or die cut seal rings 116 as shown. Suitable flexible graphite materials are available under the name GRAFOIL®, from Union Carbide Corporation, Danbury, Conn. Annular end rings 117 are disposed around the shaft between the packing material 115, and each of the apertures 111, 113. The material of construction of the end rings 117 is the flexible graphite/amorphous carbon composite of the invention.

A compression means, illustrated here as a threaded packing gland nut 119, is threaded down to compress the packing material 115 so as to conform the packing material 115 to the internal space of the stuffing box 109 not occupied by the end rings 117. The compression also forces a surface of the packing material against the surface of the shaft to form seal 121 to the passage of fluid. A surface of the end rings is forced against a surface of the shaft 101 to block the clearance 123 between the edge of the aperture. 111 and 113, and the shaft 101, thus preventing extrusion of the packing material through the clearance 123. If there are no end rings, the flexible graphite packing extrudes through the clearances, reducing the volume of the packing. In addition, if the end rings themselves are of flexible graphite without the amorphous carbon phase, the end rings are prone to also extrude through the clearances.

The dimensions of the end ring of the invention are generally the same as prior art end rings made of, for example, braided materials, and depend upon the size of the device and packing for which it is intended. Generally the end ring is of an annular shape with an inside diameter corresponding to the diameter or the shaft.

As discussed above, an advantageous property of the end ring of the invention is that it presents a hard and slightly abrasive surface to the moving shaft which cleans and polishes the shaft as it moves through the packing. In some applications it may be desirable to increase this abrasive effect. This can be accomplished by addition of a minor amount of a ceramic material to the mixture of flexible graphite and binder. The ceramic material is preferably added in an amount between about 2 and 30 wt. %, based on the weight of the mixture. The ceramic material can be added by blending a powdered ceramic, such as a refractory oxide, or boron nitride, silicon nitride, titanium diboride, with the flexible graphite particles and thereafter blending this ceramic/graphite particle mixture with the binder material. Optionally the flexible graphite particles may be blended with liquid sodium silicate and then reacted with carbon dioxide to leave a solid ceramic layer upon the surfaces of the flexible graphite particles.

EXAMPLES

In the examples below, the following procedure was used to manufacture composites of the invention.

Flexible graphite sheet, which is available from Union Carbide Corporation under the name of GRAFOIL ®, is milled using a shredder and hammer mill. Below in Table A is the particle size distribution of a typical ground flexible graphite used in the examples.

TABLE A

| Flexible Graphite Particle Size Distribution | | |
|---|---|---|
| Particle Size | | |
| (Tyler Mesh) | (Millimeters) | (Wt. %) |
| >20 | >0.841 | 0.0 |
| 20–35 | 0.420–0.841 | 0.7 |
| 35–65 | 0.210–0.420 | 19.5 |
| 65–100 | 0.149–0.210 | 24.5 |
| 100–200 | 0.074–0.149 | 35.7 |
| <200 | <0.074 | 19.6 |

A phenolic thermosetting resin is blended in a Hobart ™ mixer with the flexible graphite particles. The resin is available from Borden Chemical Company, under the tradename of SC-1008. Before blending, the resin is diluted to 50 vol. % with isopropyl alcohol to ease dispersion of the resin in the flexible graphite particles.

The blended mixture is then allowed to stand in a fume hood for 16 to 48 hours to allow the isopropyl alcohol to evaporate. If the mixture is not going to be used at once it should be stored in a freezer at 0° C.

The mixture is molded by compressing the in an appropriately sized die to a density of about 110 lb/ft³. The molded article is then cured by heating at a rate of 6°/hr from 30° to 130° C., and holding at 130° C. for 1 hour to cure the resin in the molded article. After curing, resin in the article is carbonized by heating in a nitrogen atmosphere at 30°/hr from 50° C. to 525° C. and holding at 525° C. for 30 minutes. After cooling, the resulting composite is ready to use. The density of the composite shape is about 100 lbs/ft³.

EXAMPLE I

Tests were made of end rings of the invention in a packing of a valve seal of the general type illustrated in FIG. 1.

The composite rings of the invention were manufactured by the above procedure by blending 80 wt. % of the flexible graphite particles with 20 wt. % of the phenolic resin, based on the total weight. The approximate dimensions of the rings were; 1 inch outside diameter, ½ inch inside diameter, and ¼ inch thickness.

The end rings were installed in a valve seal packing system as illustrated in the figure, with die cut flexible graphite rings as the seal rings 116. The valve was of the reciprocating type. The shaft of the valve was cycled though the packing by continuously opening and closing the valve at a temperature of 700° F. and a pressure of 350 psi. The valve was cycled for 328,000 cycles, which is the normal life of a valve, without failure of the ring. In comparison, the average life before failure of packing systems with braided graphite fiber end rings or die cut flexible graphite seal rings, under similar conditions, is about 100,000 cycles.

EXAMPLE II

Comparative tests were made of thrust bearing rings for ball valves. Comparative flexible graphite diemolded rings, and rings of the composite of the invention were made. The approximate dimensions of the rings were ⅝ inch outside diameter, ⅜ inch inside diameter, and 1/16 inch thickness. Each thrust ring to be tested was installed on a ball valve with a 1 inch ball by first installing flexible graphite seal rings over the stem of the ball, placing the thrust ring on the stem over the seal ring, and tightening a gland nut over the stem to compress the seal and thrust rings.

The composite rings of the invention were manufactured by the above procedure by blending 65 wt. % of the flexible graphite particles with 35 wt. % of the phenolic resin, based on the total weight.

The comparative flexible graphite rings were molded from flexible graphite sheet to a density of 90 lb/ft³. This type of ring is currently being used commercially in ball valves.

The composite rings of the invention and the comparative rings were tested by continuously cycling the valve stem at room temperature and at a slight positive gauge pressure. A cycle was performed by opening the valve by a ¼ turn of the stem, and closing the valve by a ¼ turn in the opposite direction. The comparative flexible graphite rings failed before 5,000 cycles. The cycle life of the composite rings of the invention were about 20,000 cycles, which is the normal life of the valve itself.

While this invention has been described with reference to certain specific embodiments and examples, it is recognized by those skilled in the art that many variations are possible without departing from the scope and spirit of the invention, and that the invention, as described by the claims, is intended to cover all changes and modifications which do not depart from the spirit of the invention.

What is claimed is:

1. A seal adapted to prevent fluid leakage through the clearance between a moving shaft and the edge of an aperture where the shaft passes through the aperture in a wall which comprises:
   (a) container means disposed upon the wall and around the shaft and around the aperture in the wall;
   (b) resilient packing material disposed in the container means around the shaft;
   (c) end ring disposed within the container means around the shaft over the clearance between the shaft and the edge of the aperture and adjacent the packing material, the end ring comprising particles of flexible graphite and an amorphous carbon phase binding the flexible graphite particles together; and
   (d) compression means to compress the end ring and packing material in the direction of the shaft axis to cause the packing material to conform to the interior space of the container means and the shape of the shaft to provide a seal, and to cause the end ring to block the clearance between the shaft and the edge of the aperture to inhibit extrusion of the packing material through the clearance.

2. The seal of claim 1 wherein the amorphous carbon phase of the end ring occupies between 1 weight percent and 50 weight percent of the end ring, based on the weight of the end ring.

3. The seal of claim 1 wherein the amorphous carbon phase of the end ring occupies between 8 weight percent and 35 weight percent of the end ring, based on the weight of the end ring.

4. The seal of claim 1 wherein the density of the end ring is between 50 lb/ft$^3$ and 130 lb/ft$^3$.

5. The seal of claim 1 wherein the density of the end ring is between 80 lb/ft$^3$ and 100 lb/ft$^3$.

6. The seal of claim 1 wherein the compressibility of the end ring is between 5% and 11%.

7. The seal of claim 1 wherein the end ring also comprises a minor amount of ceramic material.

8. The seal of claim 7 wherein the ceramic material in the end ring is present in an amount between 2 weight percent and 30 weight percent, based on the weight of the end ring.

9. The seal of claim 1 wherein the resilient packing material is flexible graphite.

10. The seal of claim 1 wherein the container means comprises a second aperture through which the shaft passes through a wall of the container means and opposite the aperture in the wall, and the seal additionally comprises a second end ring disposed within the container means around the shaft over the clearance between the shaft and the edge of the second aperture, said second seal ring comprising particles of flexible graphite and an amorphous carbon phase binding the flexible graphite particles together.

* * * * *

UNITED STATES PATENT AND TRADEMARK OFFICE
CERTIFICATE OF CORRECTION

PATENT NO. : 4,826,181
DATED : May 2, 1989
INVENTOR(S) : Ronald A. Howard

It is certified that error appears in the above-identified patent and that said Letters Patent is hereby corrected as shown below:

Column 4, line 21, "and" should read "end".

Column 6, line 55, "115" should read "105".

Signed and Sealed this

Twenty-sixth Day of June, 1990

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,826,181
DATED : May 2, 1989
INVENTOR(S) : Ronald A. Howard

It is certified that error appears in the above-identified patent and that said Letters Patent is hereby corrected as shown below:

Column 3, line 10, delete "(c)" and substitute therefor --(b)--.

Column 3, line 12, delete "(b)" and substitute therefor --(c)--.

Column 4, line 30, delete "cause" and substitute therefor --causes--.

Column 4, line 35, delete "though" and substitute therefor --through--.

Column 6, line 4, delete "ma" and substitute therefor --may--.

Column 7, line 25, delete "or" and substitute therefor --of--.

Column 8, line 9, after the second occurrence of the word "the" insert --mixture--.

Column 8, line 34, delete "though" and substitute therefor --through--.

Signed and Sealed this

Sixth Day of November, 1990

Attest:

HARRY F. MANBECK, JR.

*Attesting Officer*  *Commissioner of Patents and Trademarks*